(12) United States Patent
Schultz

(10) Patent No.: US 8,478,596 B2
(45) Date of Patent: Jul. 2, 2013

(54) IMPAIRMENT DETECTION USING SPEECH

(75) Inventor: Paul T. Schultz, Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1867 days.

(21) Appl. No.: 11/287,358

(22) Filed: Nov. 28, 2005

(65) Prior Publication Data

US 2007/0124135 A1    May 31, 2007

(51) Int. Cl.
*G10L 11/00* (2006.01)

(52) U.S. Cl.
USPC ............... 704/270; 704/200; 704/201

(58) Field of Classification Search
USPC ............ 704/201, 270, 275, 273, 200
See application file for complete search history.

(56) References Cited

U.S. PATENT DOCUMENTS

| | | | | |
|---|---|---|---|---|
| 4,843,377 A | * | 6/1989 | Fuller et al. | 340/573.4 |
| 4,994,613 A | * | 2/1991 | Fruchey | 564/259 |
| 5,647,834 A | * | 7/1997 | Ron | 600/23 |
| 5,983,189 A | * | 11/1999 | Lee | 704/275 |
| 6,006,188 A | * | 12/1999 | Bogdashevsky et al. | 704/270 |
| 6,157,913 A | * | 12/2000 | Bernstein | 704/275 |
| 6,236,968 B1 | * | 5/2001 | Kanevsky et al. | 704/275 |
| 6,275,806 B1 | * | 8/2001 | Pertrushin | 704/272 |
| 6,427,137 B2 | * | 7/2002 | Petrushin | 704/273 |
| 6,480,826 B2 | * | 11/2002 | Pertrushin | 704/270 |
| 6,671,672 B1 | * | 12/2003 | Heck | 704/273 |
| 6,697,457 B2 | * | 2/2004 | Petrushin | 379/88.08 |
| 6,748,301 B1 | * | 6/2004 | Ryu | 701/1 |
| 7,324,944 B2 | * | 1/2008 | Hansen et al. | 704/270 |
| 8,094,803 B2 | * | 1/2012 | Danson et al. | 379/265.02 |
| 2002/0002464 A1 | * | 1/2002 | Petrushin | 704/275 |
| 2002/0084130 A1 | * | 7/2002 | Der Ghazarian et al. | 180/272 |

* cited by examiner

*Primary Examiner* — Angela A Armstrong

(57) ABSTRACT

A device may include logic configured to receive a first speech input from a party, to compare the first speech input to a second speech input to produce a result, and to determine if the party is impaired based on the result.

26 Claims, 7 Drawing Sheets

| CLIENT ID: | | | |
|---|---|---|---|
| DATE: | TIME: | | ADMINISTRATOR: |

| BASELINE INPUT | USER TEST INPUT | SCORE | COMMENTS |
|---|---|---|---|
| B-1 | T-1 | S-1 | C-1 |
| B-2 | T-2 | S-2 | C-2 |
| B-3 | T-3 | S-3 | C-3 |
| ⋮ | ⋮ | ⋮ | ⋮ |
| B-N | T-N | S-4 | C-N |

FIG. 4

IMPAIRMENT DETECTION USING SPEECH

FIELD OF THE INVENTION

Implementations consistent with the principles of the invention relate generally to techniques for processing speech and more particularly to techniques for determining if an individual is impaired by processing speech obtained from the individual.

BACKGROUND OF THE INVENTION

It may be desirable for certain agencies, such as law enforcement, and/or entities, such as transportation companies, to determine if certain individuals are impaired due to consumed substances, such as drugs or alcohol. For example, agencies may want to monitor persons convicted of driving while intoxicated (DWI) and/or persons convicted of drug related offenses. Corporations may want to monitor employees involved in jobs that are associated with public safety, such as school bus drivers, subway drivers, and/or security personnel.

Individuals that are monitored for drug and/or alcohol impairment may be required to appear at a testing location and/or testing personnel may have to travel to a monitored individual's location to perform testing designed to determine if the monitored individual is impaired. Existing testing techniques may require the use of trained personnel, such as persons trained to administer breath alcohol concentration (BRAC) tests, and/or to obtain and analyze blood samples. Existing testing techniques may also require that test data, such as blood, be sent off-site (e.g., to a laboratory) in order to obtain results. Travel costs and/or the use of specialized testing/analysis personnel may raise the costs associated with monitoring individuals to a point where implementing desired testing/monitoring protocols is discouraged. For example, it may be desirable to randomly test a DWI offender twice per week as part of the offender's parole criteria. However, if the costs associated with performing random testing twice per week are prohibitive, implementing the desired testing protocol may be discouraged.

It may be desirable to employ less costly techniques for determining if individuals are impaired.

SUMMARY OF THE INVENTION

In accordance with an implementation, a device is provided. The device may include logic configured to receive a first speech input from a party, compare the first speech input to a second speech input to produce a result, and determine if the party is impaired based on the result.

In accordance with another implementation, a method is provided. The method may include receiving a first speech input from a party and storing the first speech input. The method may include comparing a second speech input to the stored first speech input to produce a score and determining a condition of the party based on the score.

In accordance with still another implementation, a speech processing device is provided. The speech processing device may include an interface configured to receive a first speech input that includes a first plurality of speech segments, and receive a second speech input that includes a second plurality of speech segments. The speech processing device may include logic configured to store the first speech input and to compare a first segment of the first speech input to a first segment of the second speech input. The logic may be configured to determine a condition of a party based on comparing the first segment of the first speech input to the first segment of the second speech input.

In accordance with yet another implementation, an impairment detection device is provided. The impairment detection device may include means for receiving a first speech input from a party and means for storing the first speech input. The impairment detection device may include means for receiving a second speech input from the party and means for comparing the first speech input to the second speech input. The impairment detection device may include means for determining if the party is impaired based on the comparing.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 illustrates an exemplary data structure for maintaining impairment testing information consistent with the principles of the invention;

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may include a server configured to obtain speech data from an individual via a network, such as a public switched telephone network (PSTN) or a Voice over the Internet Protocol (VoIP) network. The server may compare baseline speech data obtained from the individual when the individual was known to be unimpaired, e.g., sober, to speech data obtained from the individual at a later time. The server may compare the baseline speech data to the later obtained speech data to determine a condition of the individual. A condition of an individual may represent a state for that individual, such as impaired or unimpaired. The condition of the individual may be influenced by the consumption and/or use of substances, such as alcohol and/or drugs. For example, the server, discussed above, may determine if the individual was impaired when the later speech data was obtained by comparing the baseline data to the subsequently obtained data. Results of impairment testing may be provided to an administrator, such as a parole officer. The administrator may establish the compliance or non-compliance of the monitored individual based on the condition of the monitored individual at the time the baseline data was taken and based on the condition of the monitored individual when the subsequently obtained data was taken.

Implementations consistent with the principles of the invention facilitate remote and/or automated testing of monitored individuals. As a result, monitored individuals may be tested with substantially any frequency. Frequent testing of monitored individuals may facilitate prompt identification of individuals that do not adhere to compliance criteria, such as a requirement that a monitored individual abstain from the consumption of alcohol and/or illicit drugs.

Exemplary System

Figure 1:
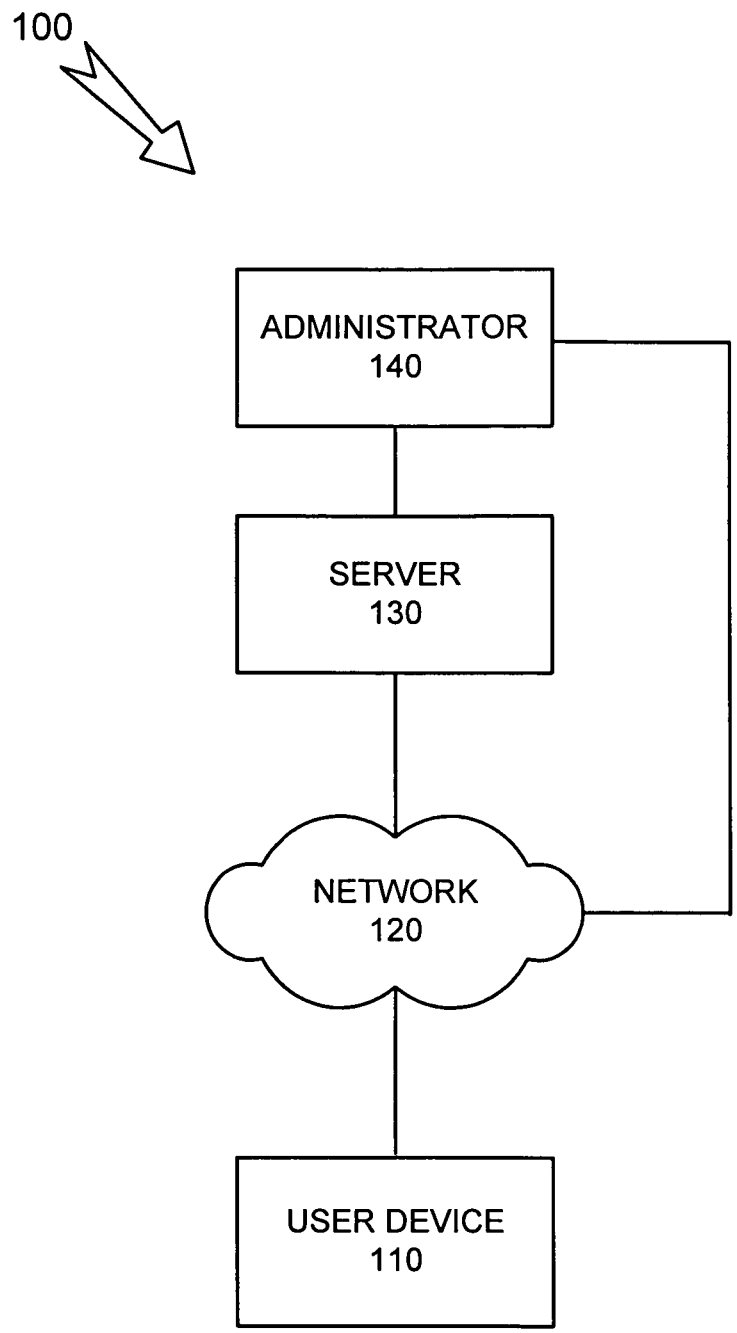
FIG. 1 illustrates an exemplary system that can be configured to operate in accordance with the principles of the invention.

FIG. 1 illustrates an exemplary system that can be configured to operate in accordance with the principles of the invention. System 100 may include a user device 110, a network 120, a server 130 and an administrator 140.

User device 110 (hereinafter user 110) may include any device capable of accepting a speech input from a user and making the speech input available to network 120. For example, user 110 may include a plain old telephone system (POTS) device, a cellular telephone, a computer or PDA with a microphone, and/or specific application devices, such as a speech input device integrated into the operator controls of a vehicle. Implementations of user 110 may make data available to network 120 in analog and/or digital form.

For example, user 110 may be implemented as an Internet protocol (IP) telephone that makes a data unit, such as a packet, available to network 120. "Data unit," as used herein, may refer to any type of machine-readable data having substantially any format that may be adapted for use in one or more networks, such as network 120. A data unit may include packet data and/or non-packet data.

Network 120 may include any network capable of transferring speech data in analog and/or digital formats. Implementations of network 120 may include networks designed primarily for speech data, such as PSTNs. In addition, network 120 may include data unit based networks, such as local area networks (LANs), metropolitan area networks (MANs) and/or wide area networks (WANs), such as the Internet, that may operate using substantially any network protocol, such as Internet protocol (IP), asynchronous transfer mode (ATM), and/or synchronous optical network (SONET).

Network 120 may include network devices, such as voice gateways, routers, switches, firewalls, and/or servers (not shown). Network 120 may be a hardwired network using wired conductors and/or optical fibers and/or may be a wireless network using free-space optical and/or radio frequency (RF) transmission paths. Implementations of networks and/or devices described herein are not limited to any particular data format, type, and/or protocol.

Server 130 may include any device configured to process speech data received via network 120. For example, server 130 may operate a testing application configured to receive a first speech input from an individual. The first speech input may be processed and stored as a template using the testing application. Server 130 may receive a second speech input and may compare the second speech input to the first speech input to determine if the individual, from whom the speech inputs were received, was impaired when the second speech input was received. Implementations may include substantially any number of servers 130 operating alone or in concert. Implementations may further include one or more servers 130 residing in a single network and/or domain and/or spread across multiple networks and/or domains. The functionality of server 130 may be implemented in other devices, such as a desktop computer, laptop, or network device, such as a router, gateway or switch.

Administrator 140 may include any device configured to receive a result from server 130 and/or configured to facilitate operation of server 130 and/or a testing application operating thereon. For example, administrator 140 may be a laptop, a desk top computer, a web enabled cellular telephone, a PDA, and/or a POTS device. Administrator 140 may be associated with an operator that is responsible for monitoring an individual that provides speech inputs to server 130. For example, a parole officer may operate administrator 140 to monitor the compliance of a parolee. Administrator 140 may be configured to instruct server 130 to obtain speech inputs according to a schedule and/or may be configured to instruct server 130 to provide results to administrator 140 according to criteria, such as when an individual is identified as being impaired by server 130 and/or the testing application.

Administrator 140 may be configured to place outbound calls to an individual, such as an individual associated with user 110. Administrator 140 may place outbound calls alone or in cooperation with server 130. For example, administrator 140 may be configured to cause server 130 to place outbound calls to user 110 according to a schedule. An individual associated with user 110 may have to submit to impairment testing according to the schedule maintained by administrator 140.

Implementations consistent with the principles of the invention may include substantially any number of administrators 140 operating alone or in concert. Implementations may further include one or more administrators 140 residing in a single network and/or domain and/or spread across multiple networks and/or domains.

Exemplary Device Architecture

Figure 2:
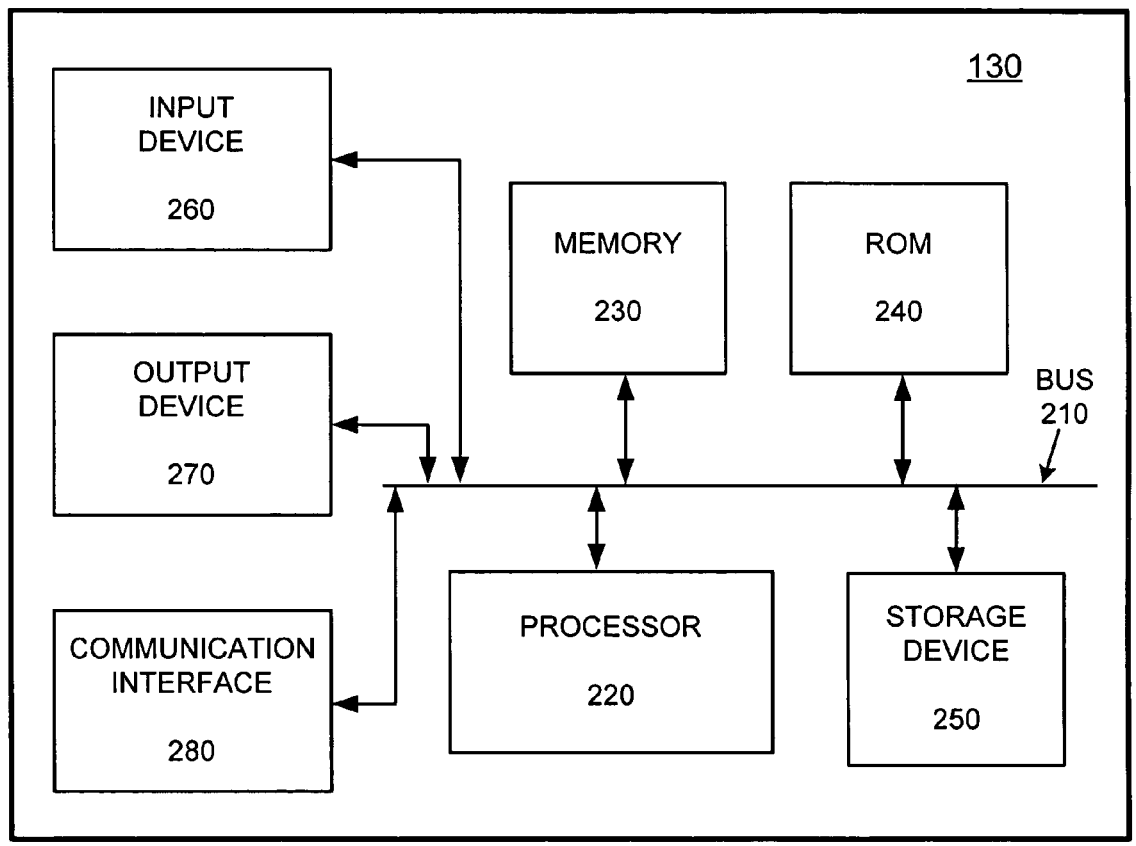
FIG. 2 illustrates an exemplary architecture for implementing the server device of FIG. 1 consistent with the principles of the invention.

FIG. 2 illustrates an exemplary architecture for implementing server 130 consistent with the principles of the invention. It will be appreciated that user 110, administrator 140, and/or other devices (not shown) that can be used in system 100 may be similarly configured. As illustrated in FIG. 2, server 130 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130.

Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit server 130 to accept information from an operator, such as a system administrator, via devices, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as administrator 140 or user 110. For example, communication interface 280 may include a modem, an Ethernet interface, and/or a port. Alternatively, communication interface 280 may include other mechanisms for communicating via a network, such as network 120.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Exemplary Functional Configuration

Figure 3:
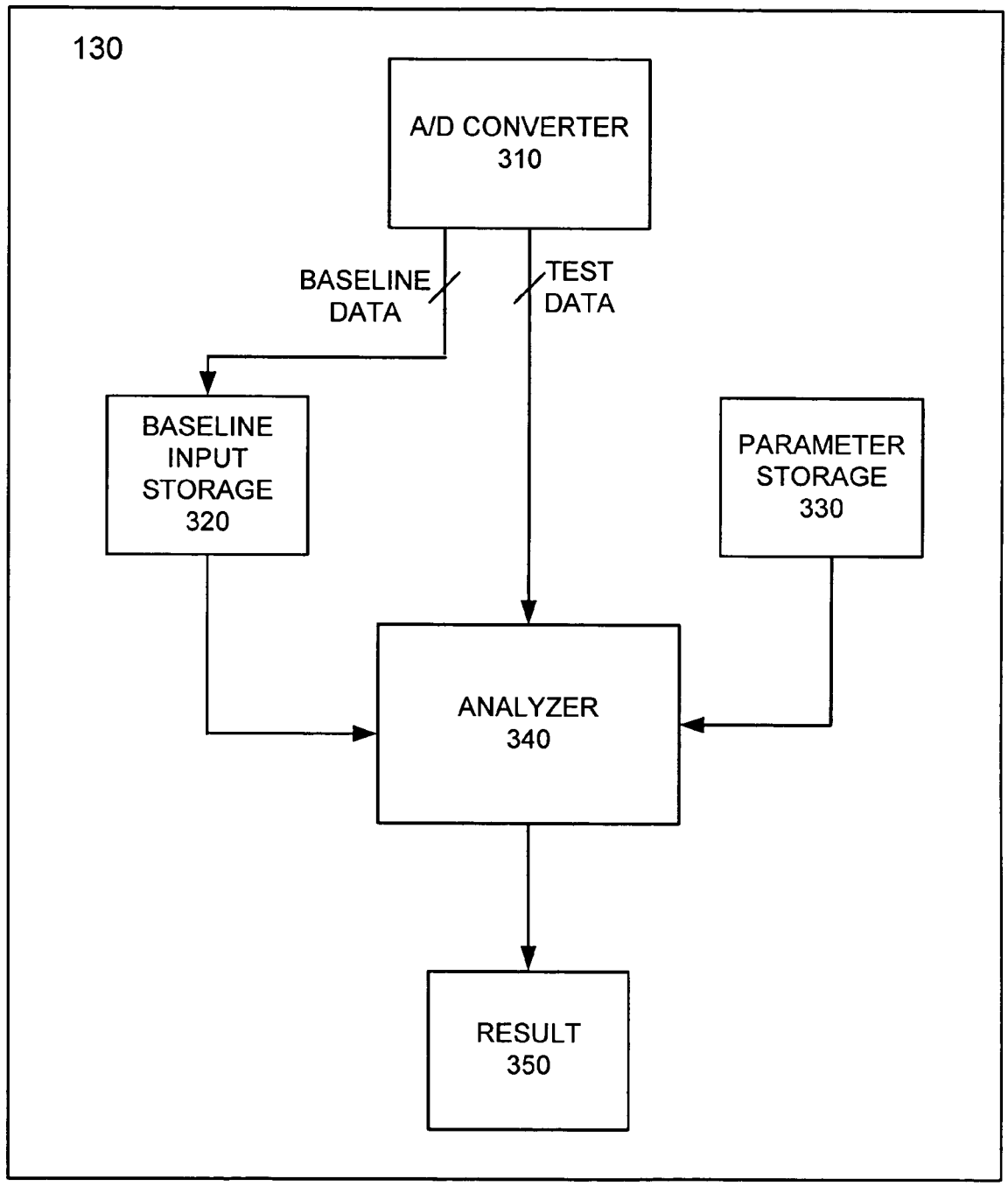
FIG. 3 illustrates an exemplary functional diagram of an impairment testing apparatus implemented via the server device architecture of FIG. 2 consistent with the principles of the invention.

FIG. 3 illustrates an exemplary functional diagram of an impairment testing apparatus implemented via the server architecture of FIG. 2 consistent with the principles of the invention. In alternative implementations, some or all of the components illustrated in FIG. 3 may be implemented in other devices or combinations of devices, such as user 110, administrator 140 and/or other network devices. The implementation illustrated in FIG. 3 may include an analog-to-digital (A/D) converter 310, baseline input storage 320, parameter storage 330, an analyzer 340 and a result 350.

A/D converter 310 may include a device for converting analog speech data into a digital format. For example, A/D converter 310 may be implemented as part of input device 260 and may be configured to accept analog voice data via a network, such as the PSTN and the Internet. A/D converter 310 may digitize the analog speech data to produce a series of bits that can be formatted to operate with baseline input storage 320 and/or analyzer 340. In one implementation, A/D converter 310 may be configured to receive digitized speech data from, for example, an IP network, and may pass digitized speech data to other components illustrated in FIG. 3.

Baseline input storage 320 may include a device to store baseline speech data received from user 110 via network 126. Baseline speech data may include any speech data obtained from an individual when the individual is believed to be unimpaired. An unimpaired individual is an individual that is not believed to be under the influence of substances that affect the motor and/or cognitive abilities of the individual. In contrast an impaired individual is an individual that may be under the influence of substances that affect the individual's motor and/or cognitive abilities. For example, a sober individual may be unimpaired, while an intoxicated individual may be impaired.

Baseline speech data may be used as a model or template that can be used with speech data obtained at a later time to determine if an individual is impaired at the time when subsequent speech samples are obtained. Baseline input storage 320 may be implemented as part of memory 230 and/or storage device 250 consistent with the principles of the invention.

Parameter storage 330 may include a device configured to store parameters that are useful for processing baseline speech samples (hereinafter baseline data) and non-baseline speech samples (hereinafter test data), such as subsequently obtained speech samples, to determine if an individual is impaired. Parameter storage 330 may include grammars, scaling values, conversion units, weighting values, etc. that facilitate determining if an individual is impaired using speech data. For example, parameter storage 330 may store a grammar that may be used by analyzer 340 to identify words that may be spoken, patterns in which spoken words may appear, and/or a spoken language associated with spoken words. Parameter storage 330 may be implemented as part of memory 230 and/or storage device 250 consistent with the principles of the invention.

Analyzer 340 may include a device configured to operate on baseline data, test data, and/or parameters to produce a result that can be used to determine if an individual is impaired. Analyzer 340 may be implemented via processor 220 consistent with the principles of the invention and may employ speech recognition and/or biometric voice verification techniques to determine if an individual is impaired. Speech recognition techniques may use a grammar and/or processing algorithms to recognize words, sounds, and/or phrases received by analyzer 340. Biometric voice verification techniques may process speech inputs to produce a model for a speaker that is based on the physiology of the speaker, such as a speaking rate, length of pauses, misarticulation and/or nonfluency. Speech recognition and/or biometric voice verification techniques used with implementations of analyzer 340 may produce a score that is indicative of a level of impairment for an individual that provided baseline data and/or test data.

Assume that analyzer 340 employs speech recognition and biometric voice verification techniques to evaluate characteristics of a spoken phrase, such as a speaking rate for the caller, a number of pauses in the spoken phrase, the length of pauses in the spoken phrase, misarticulation of a portion of the spoken phrase, nonfluency of a portion of the spoken phrase, frequency variability of the caller when speaking a portion of the phrase, and/or a vocal intensity of the caller when speaking a portion of the phrase. Analyzer 340 may operate on the spoken phrase and may produce a score represented as a percentage from 0 to 100%, where the percentage represents a confidence level as to how closely a test phrase matches a baseline phrase. For example, 100% may indicate that the test phrase is a perfect match with a corresponding baseline phrase and 0% may indicate that there is no match between the test phrase and the baseline phrase.

Result 350 may include a device configured to produce a result based on operations performed by analyzer 340. Result 350 may be incorporated into analyzer 340 or may be implemented separately. Result 350 may accept an output from analyzer 340, such as a score, and may operate on the score to produce a result that can be used by administrator 140 and/or an operator associated therewith. Result 350 may utilize processor 220 and/or storage device 250 and may make a result available to communication interface 280. Result 350 may also include a memory device to store the generated results.

Exemplary Data Structure

FIG. 4 illustrates an exemplary data structure for maintaining impairment testing information consistent with the principles of the invention. Data structure 400 may include a client identifier field 410, a date field 420, a time field 430, an administrator field 440, a baseline input field 450, a user test input field 460, a score field 470, and a comments field 480. Data structure 400 may reside in memory 230 and/or storage device 250.

Client ID 410 may include information that identifies an individual (hereinafter caller) that makes baseline data and/or test data available to a testing application operating on server 130. Client ID 410 may include a caller's name and/or other identifying information such as a social security number, inmate number, employee number, etc. Date 420 may include a date on which data structure 400 was created, accessed, and/or modified on behalf of the caller that is identified with client ID 410. Time 430 may include a time value that identifies when data structure 400 was created, accessed, and/or modified. Administrator 440 may include information that can be used to identify an individual associated with monitoring the caller associated with client ID 410, monitoring data structure 400, and/or for receiving and/or interpreting result 350. For example, administrator 440 may identify a parole officer responsible for monitoring the impairment status of a parolee that is identified by caller ID 410.

Baseline input 450 may include one or more speech segments and/or identifiers, such as pointers, to speech segments that are associated with baseline data obtained from the caller associated with client ID 410. For example, baseline input 450 may represent a column in data structure 400 that includes a number of entries where each entry corresponds to a speech segment that was recorded to establish a baseline speech sample for a caller. Assume that a caller is asked to speak the letters "z", "y", and "x". The spoken letters may be received by a testing application operating on server 130 and may be stored as entries in baseline input 450. For example, entry B-1 may include "z", entry B-2 may include "y" and entry B-3 may include "x". Alternatively, entry B-1 may include all letters associated with a phrase (e.g., z, y and x) and entry B-2 may include data associated with another phrase, such as a response to another baseline prompt. Implementations may store raw baseline inputs and/or may compute speech recognition and speaker verification scores for baseline inputs that can be stored in data structure 400 along with the raw baseline inputs. Stored speech recognition and speaker verification scores may be utilized by server 130 when computing an overall impairment score for a caller in conjunction with scores that are associated with corresponding user test inputs.

User test input 460 may include one or more speech segments and/or identifiers, such as pointers, to speech segments that are associated with test data received from a caller associated with client ID 410. For example, impairment testing may be performed on the caller associated with client ID 410 by asking the caller to provide test inputs by speaking the letters "z", "y", and "x". These test inputs may correspond, respectively, to the letters "z", "y", and "x" that were stored in the corresponding entry of baseline input 450.

Score 470 may include information associated with processing an entry in baseline input 450 and a corresponding entry in user test input 460. For example, score S-1 may represent a result produced by comparing baseline phrase B-1 (i.e., z) to user test input phrase T-1 (i.e., z). Score 470 may be produced using speech recognition techniques and/or biometric voice verification techniques. For example, speech recognition techniques may be used to determine if the letters "z", "y", and "x" were spoken as part of user test inputs T1-T3, respectively. Biometric voice verification techniques may be used to determine if pauses between the spoken letters, the frequency of the caller's voice, voice inflections of the caller, etc. for user test inputs T1 to T3 are indicative of an impaired state of the caller when compared to the frequency of the caller's voice, voice inflections of the caller, etc. associated with baseline inputs B-1 to B-3. Score 470 may represent a deviation between an entry in baseline input 450 and a corresponding entry of user test input 460.

Comments 480 may include information associated with corresponding entries in baseline input 450, user test input 460 and/or score 470. Information in comments 480 may be provided by server 130 and/or an operator associated with administrator 140. For example, analyzer 340 may determine that background noise associated with a phone line on which user test inputs 460 are obtained is higher than a background noise level associated with a phone line on which the corresponding baseline inputs 450 were obtained. Server 130 may generate a comment that notes the difference in background noise levels so that an operator can use the information when interpreting result 350. An operator may also include information in comments 480. For example, an operator may notice that certain baseline inputs 450 and user test inputs 460 provide more reliable indications of impairment than others of the baseline inputs 450 and user test inputs 460. The operator may include entries in comments 480 for the appropriate entries so that these entries may be used with greater frequency during subsequent tests performed on a caller.

Exemplary Initialization Process

Figure 5:
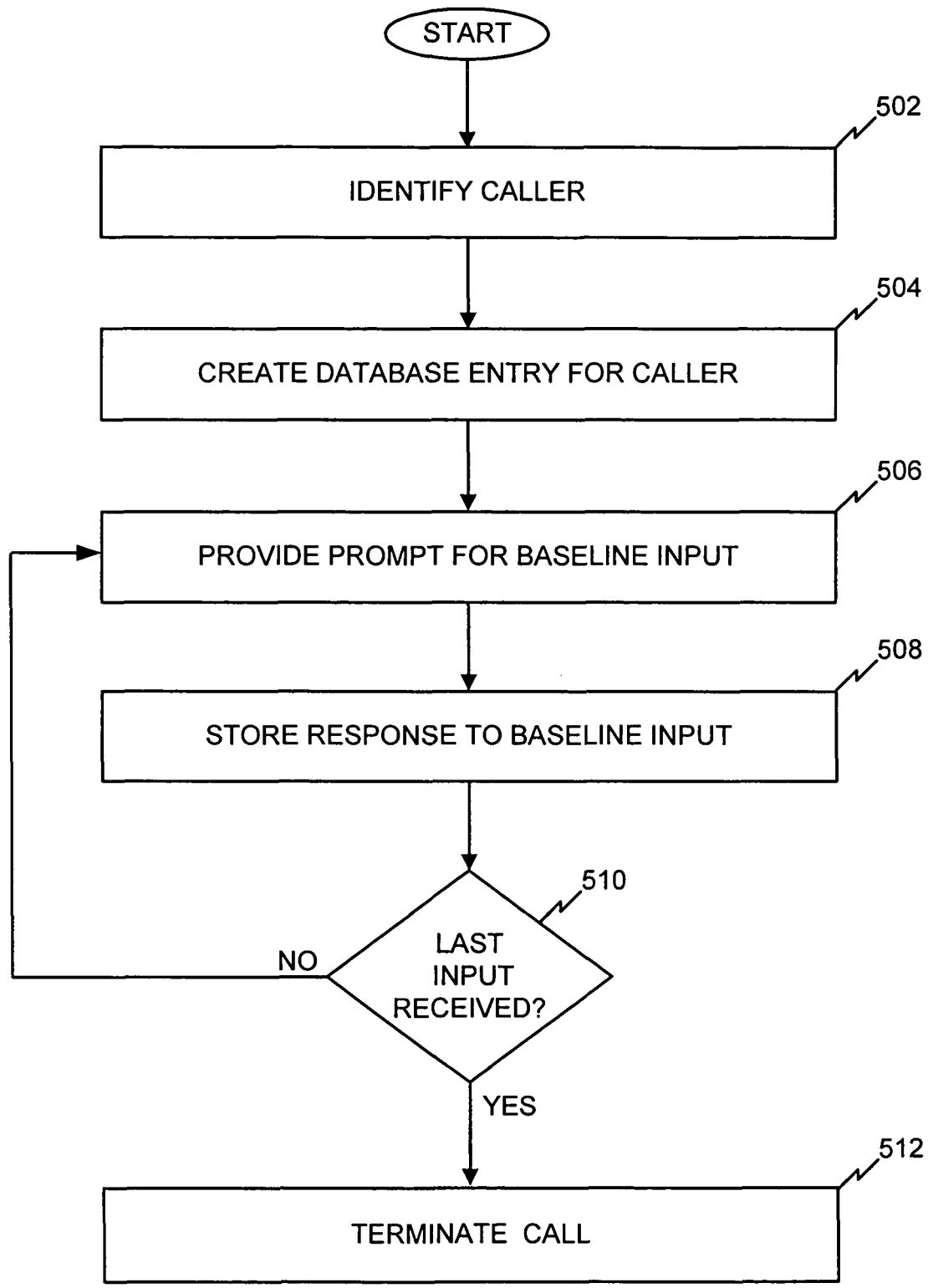
FIG. 5 illustrates an exemplary method for obtaining baseline inputs for use in performing impairment testing consistent with the principles of the invention.

FIG. 5 illustrates an exemplary method for obtaining baseline data for use in performing impairment testing consistent with the principles of the invention. A caller may be selected for impairment testing. Callers may be selected based on past conduct, such as alcohol and/or drug related offenses, and/or based on employment, such as workers involved in jobs that affect public safety.

Baseline data may be obtained from the selected party when the party is in an unimpaired state. The baseline data may be compared against subsequently obtained speech samples to determine if the party is impaired. One or more techniques may be used to determine if the party is unimpaired before gathering baseline speech data using implementations consistent with the principles of the invention. For example, the party may be given a blood test, urine test, a BRAC test, such as a breathalyzer test, field sobriety test, and/or other tests to ensure that the party is not impaired when baseline data is obtained.

Baseline data may be obtained from a party in the presence of an operator, such as a parole officer, police officer, medical professional, employee of a company, etc. to ensure that baseline data is provided by a desired party and not by an imposter. Alternatively, baseline data may be obtained from a party when the party is not in the physical presence of an operator, such as by having the party place a call to the testing application from his/her residence when the party is under house arrest or in a half-way house.

An operator may initiate an impairment testing application operating in conjunction with server 130. For example, the operator may enter an identification number via a keypad associated with a telephone. The operator may provide a handset associated with the telephone to the party being tested after a session has been established with server 130 and a testing application operating thereon.

The identity of the caller may be identified (act 502). For example, the caller may be asked to speak his/her name and/or other identifying information such as a social security number, employee number, and/or inmate/parolee identification number. Assume that the testing application provides the caller with the prompt, "Welcome to the Remote Check-in System. Just speak naturally as you respond to the following instructions. Please say your 7-digit parolee ID number." The caller may respond by speaking "6, 2, 2, 3, 7, 2, 9" and the testing application may respond with "You have been identified." The caller's identity may be validated by server 130 and/or the testing application based on the caller's identifying information provided above. Server 130 may also use other information to validate the identity of the caller, such as finger print information obtained via a finger print scan.

A database entry may be created for the validated caller (act 504). For example, data structure 400 may be created on behalf of the validated caller. Data structure 400 may be populated with information for identifying the caller and with information that identifies when data structure 400 was created. The testing application may prompt the caller for self-assessment data prior to obtaining baseline data. Self-assessment data may be used to determine if accepting baseline data is worthwhile at a given time. For example, the testing application may prompt the caller with "Before we begin, are you currently under the influence of drugs or alcohol?" The caller may respond with "No." Baseline speech data may be obtained based on the callers "No" response and/or based on testing performed on the caller by an operator prior to initializing the testing application on server 130.

The caller may be prompted to provide a first baseline input (act 506). For example, the test application may prompt the caller with "Okay, let's get started. First, you will say the complete alphabet like this: A, B, C, D . . . and so on all the way to Z. Now, please say the complete alphabet." The testing application may obtain the caller's response to the first prompt. For example, the caller may speak "A, B, C, D, E, F, G, H, I, J, K, L, M, N, O, P, Q, R, S, T, U, V, W, X, Y, Z." The testing application may respond with "Your input has been received."

In one implementation, the testing application may be configured to ask the caller to provide a response in multiple languages if a caller is bi-lingual. For example, the testing application may ask the caller to provide a response in English and then may ask the caller to provide the response in his/her native language. The testing application and/or the operator may determine that a caller may be more prone to speech errors in a particular language when under the influence of alcohol and/or drugs.

The testing application may store the caller's response in data structure 400 (act 508). For example, the alphabet may be stored in entry B-1 of data structure 400 and/or the alphabet may be stored across multiple entries, such as by storing "A" in entry B-1 and by storing "Z" in entry B-26.

The testing application may determine if the stored baseline input is the last input associated with baseline testing of the caller (act 510). If the most recently stored baseline input is the last input, the current calling session may be terminated by the testing application (act 512). In contrast if the most recently stored baseline input associated with act 508 is not the last baseline input that should be associated with the calling session, acts 506-510 may be repeated until a last input is received and stored by the testing application.

For example, if a last input has not been received, the testing application may prompt the caller with "Now, count backward from 100 to 90." The caller may respond by speaking "100, 99, 98, 97, 96, 95, 94, 93, 92, 91, 90." The testing application may store the caller's response in data structure 400 and may provide the caller with the prompt "Good. Finally, repeat the following phrase after me: This summer is an especially freezing situation." The caller may respond by speaking "This summer is an especially freezing situation."

In certain situations the testing application may request that the caller speak a phrase a second time to ensure that baseline inputs are of sufficient quality to facilitate acceptable comparisons with subsequently obtained test inputs. For example, the testing application may request that the caller repeat the last phrase by prompting the caller with "Say the following phrase one more time: This summer is an especially freezing situation." The caller may respond with "This summer is an especially freezing situation." The testing application may store the response in data structure 400 and may provide a termination statement to the caller, such as "All right, that's it. Thanks, goodbye," before terminating the calling session (act 512).

In one implementation, the testing application may obtain more baseline inputs than are required to perform impairment testing on a party via test inputs. Obtaining an excess number of baseline inputs may allow the testing application to provide the party with a randomly selected subset of the baseline prompts as testing prompts. The use of randomly selected subsets of baseline prompts as testing prompts may make impairment testing using implementations of the invention less susceptible to deception techniques, such as replay attacks. A replay attack may occur when a party records responses to baseline prompts and uses those recorded responses as inputs to the testing application when the testing application is attempting to gather test data in response to test prompts.

The description above with respect to receiving test inputs describes a party providing test inputs via a telephone. In other situations, the test inputs may be received in person. That is, the party may directly input test inputs to server 130 and/or an administrator associated with server 130.

Exemplary Testing Process

Figure 6A:
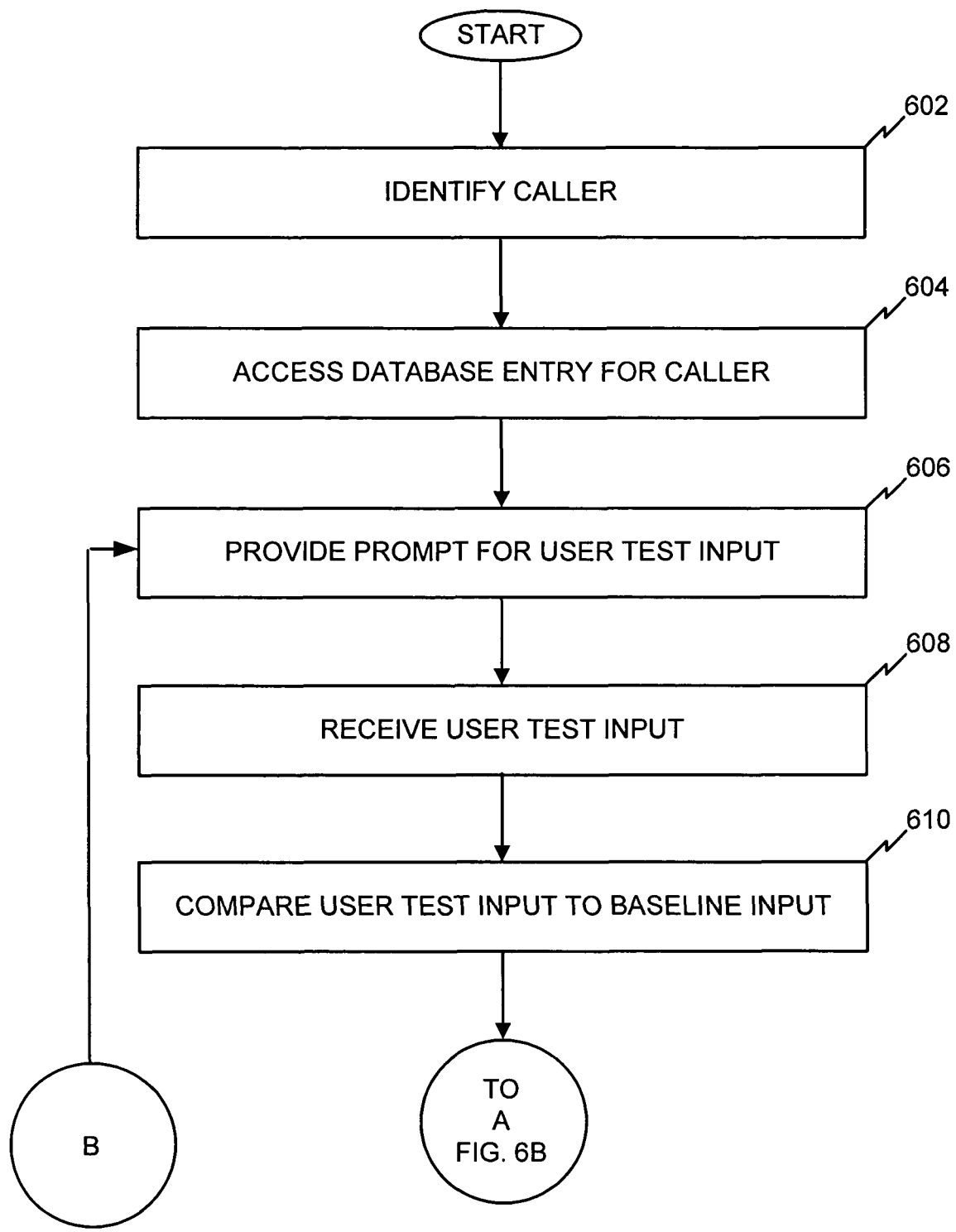
FIGS. 6A and B illustrate an exemplary method for obtaining test user inputs for use in determining if an individual is impaired consistent with the principles of the invention.
Figure 6B:
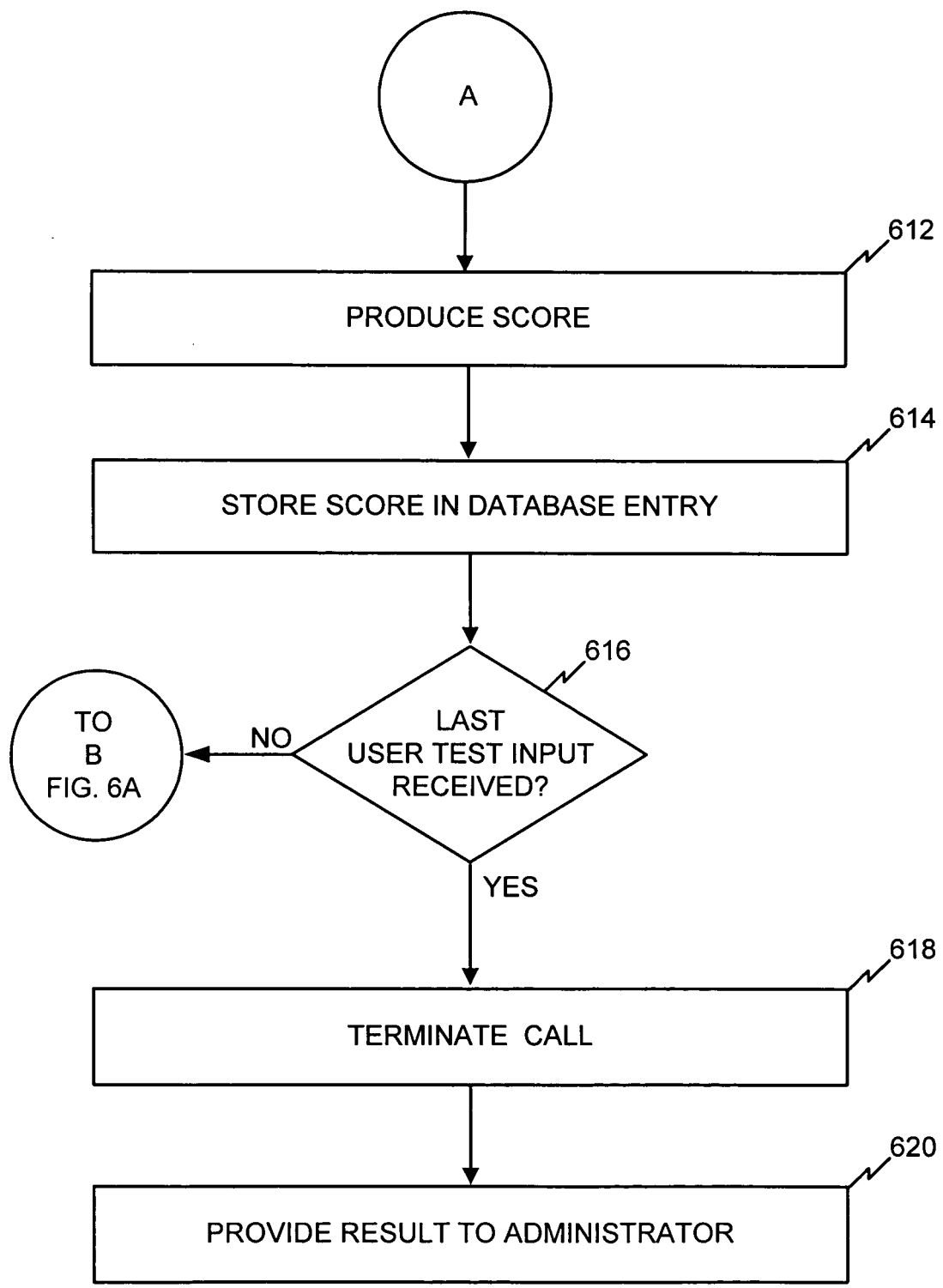

FIGS. 6A and 6B illustrate an exemplary method for obtaining test data and determining if a party is impaired consistent with the principles of the invention. A party may be required to call the testing application at determined times, such as on a fixed schedule of once per week, on holidays, on weekends, etc. In other implementations, the party may be prompted to call the testing application at random times or on demand. For example, the testing application may page the party and may tell the party to complete impairment testing within 30 minutes of receiving the page. Implementations may be configured to place outbound calls to a party according to a fixed schedule and/or at random times. A party may be required to participate in impairment testing when the party answers a call placed by administrator 140 and/or server 130.

A party may contact the testing application by dialing a number associated with the testing application via a PSTN and/or Internet compatible device located, for example, at the party's residence or place of employment. The testing application may provide the caller with a prompt, such as "Welcome to the Remote Check-in System. Just speak naturally as you respond to the following instructions. Please say your 7-digit parolee ID number." The caller may respond by speaking "6, 2, 2, um . . . 3, 7, 2, 9" into a handset associated with the PSTN device. The testing application may identify the caller (act 602) (FIG. 6A) and may provide the caller with an indication that his/her identity has been confirmed, such as "You have been identified." The party may alternatively be identified using an automatic number identification (ANI) system that determines the telephone number of the incoming call and correlates the number to a party.

The testing application may access a database entry associated with the caller (act 604). For example, the testing application may access data structure 400 that was created for the caller as described above with respect to FIG. 5. Data structure 400 may include, among other things, baseline inputs received from the caller.

The testing application may provide the caller with an initial prompt that is configured to obtain self-assessment information from the caller. For example, the testing application may provide the caller with a prompt, such as "Before we begin, are you currently under the influence of drugs or alcohol?" The caller may respond with "Ah, no." The testing application may store this information in data structure 400.

The testing application may provide the caller with a first test prompt, such as "Okay, let's get started. First, you will say the complete alphabet like this: A, B, C, D . . . and so on all the way to Z. Now, you say the complete alphabet" (act 606).

The testing application may receive a test input by way of a response from the caller, such as "Ahem . . . A, B, C,"<long pause> "Ahem . . . D" (act 608).

The testing application may store this input in, for example, user test input field 460. The testing application may attempt to compare the stored test input to the corresponding baseline input (act 610). In certain situations, such as the response above, the testing application may have difficulty associating the test input with a corresponding baseline input. For example, the long pause and the "ahem" before "D" may have caused the test input to be out of grammar, i.e., the test input was not recognized as being related to the corresponding test prompt and/or baseline input stored in data structure 400. In situations where a test input is not recognized, the testing application may make a second request for the same information. For example, the testing application may prompt the caller with "Let's try that again. Please say the complete alphabet like this: A, B, C, D . . . and so on all the way to Z. Now, please say the complete alphabet." The caller may respond with "A, B, C, D, ah, F, D, Oops . . . " The testing application may attempt to compare the caller's second response with the corresponding baseline input in data structure 400.

The testing application may produce a score based on the caller's response (act 612) (FIG. 6B). For example, analyzer 340 may analyze the speech input based on various metrics, such as articulation, speaking rate, length of pauses, etc. Analyzer 340 may forward this information to result 350 to generate an overall score. In the situation above, the caller's score may be very low, such as zero on a scale of zero to 100, since an incomplete response was provided by the caller. The testing application may store the score in score field 470 of data structure 400 (act 614). The testing application may further store a comment that indicates that the testing system considered the response to be incomplete. The testing application may also store indicators for parameters, such as "No Speech Timeout" (for the long pause) and for "Out of Grammar" (when the alphabet recognition was incorrect). In addition, the caller's response may be stored to an audio file so that the caller's exact response can be played back and/or analyzed. For example, raw audio may be played back during a court and/or parole proceeding involving the caller.

The testing application may determine if the caller's most recent response was provided in response to a final prompt (act 616). If the caller's most recent response is associated with a final prompt, the calling session may be terminated (act 618). In contrast, if the caller's response was not associated with a final prompt, processing flow may return to act 606 (FIG. 6A).

Assume that the final test input has not been received. The testing application may provide the caller with another prompt, such as "All right, let's try something different. Now, count backward from 100 to 90." The caller may respond with "100, ah . . . 97, 96, 95, 94, ah . . . 91, 90." The testing application may store the response in user test input field 460 and compare the caller's response to the corresponding baseline input to produce a score for the entire response or for portions of the response. The testing application may also store raw audio associated with the response for later analysis and/or use. The testing application may provide the caller with "Response received. Finally, repeat the following phrase after me: This summer is an especially freezing situation." The caller may respond with "The sus . . . summer is and specially frizzing sit-she-a-shun." The testing application may ask the caller to repeat the above response by providing the prompt "Say the following phrase one more time: This summer is an especially freezing situation." The testing application may receive "This slummer is special freezing sssit . . . um sit-shun" in response to the prompt. The testing application may attempt to compute a score for the caller's first response attempt and/or the caller's second response attempt by comparing the first or second attempt to a corresponding baseline input. For example, the testing application may determine a deviation from a baseline input for the test response. The deviation may be represented as a score that represents a likelihood that the caller is impaired. For example, a score of 75% may indicate that the testing application has a confidence level of 75% that the caller is impaired based on the caller's responses to the prompts. Score(s) and raw audio may be stored in score 470 in data structure 400. After the last input has been received, the calling session may be terminated (act 618) (FIG. 6B).

The testing application may provide a result associated with the caller to administrator 140 and/or an operator associated therewith (act 620). For example, result 350 (FIG. 3) may include scores and/or audio files that can be played by an operator via administrator 140. The result may include information, such as scores, in a number of formats. For example, the result may include raw scores as computed by analyzer 340, scores that have been converted into a format that can be readily understood by an operator of administrator 140. For example, the result may be provided to the operator as a plot of the current scores along with historical data (e.g., scores associated with prior testing sessions) so that the operator may better interpret scores from the current testing session. An overall pass/fail evaluation may also be generated by result 350 that indicates whether the caller is believed to be slightly impaired, highly impaired, or not impaired.

Implementations consistent with the principles of the invention may be implemented in forms other than those disclosed above. For example, a first alternative implementation may include an impairment detection device that is used by school bus drivers prior to beginning a driving shift or prior to going home after completing a driving shift. Assume that a dispatcher's office provides drivers with keys to the school buses at the beginning of a shift. Further assume that the drivers must complete a testing session with an impairment testing device consistent with the principles of the invention prior to being given keys for a bus. Drivers may only receive keys when they are determined to be unimpaired. Drivers may further be required to complete a testing session with the impairment testing device after completing a shift to ensure that drivers have not consumed alcohol or drugs during their shifts.

A second alternative implementation consistent with the principles of the invention may employ impairment testing in cooperation with tracking devices, such as a global positioning system (GPS) equipped bracelet worn by parolees to monitor their whereabouts. The bracelet may be integrated with system 100 so as to broadcast the location of a caller if the caller is determined to be impaired based on results produced by system 100. Monitoring personnel may be dispatched to the caller's location to detain the caller and/or to subject the caller to additional testing, such as a BRAC test.

A third alternative implementation consistent with the principles of the invention may be implemented as a standalone impairment testing device, such as a handheld impairment testing device. The standalone system may be used by a party of determine if he/she is impaired. The standalone system may provide result 350 directly to the party that was tested. A standalone system may be used by individuals to determine their own state of impairment when alcohol and/or drugs have been consumed.

A fourth alternative implementation consistent with the principles of the invention may be implemented as an impairment testing device integrated into another device and/or system, such as an automobile. Assume that an automobile is operated by an individual that has been convicted of DWI. Further assume that a condition of the individual's parole is that he/she does not operate a vehicle while under the influence of alcohol and/or drugs. The individual's automobile may be equipped with an impairment testing system that is integrated into the operator controls of the automobile, such as the ignition switch, steering controls, and/or accelerator/braking mechanisms. The impairment testing system may be configured so that the individual must complete a testing session before being given access to the operator controls on the vehicle. Access may only be given to the individual when the testing system determines that the individual is not impaired.

CONCLUSION

Implementations consistent with the principles of the invention may allow for remotely testing individuals to determine if the individuals are impaired. The implementations may let an individual record baseline speech data. A testing application may accept inputs from the individual and may compare the inputs to the baseline speech data to determine if the individual is impaired when the inputs are received from the individual. Since implementations consistent with the principles of the invention may test callers via an automated system, testing costs may remain low even when testing is performed numerous times on a caller.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, implementations consistent with the principles of the invention can be implemented using devices and configurations other than those illustrated in the figures and described in the specification without departing from the spirit of the invention. Devices and/or components may be added and/or removed from the implementations of FIGS. 1-3 depending on specific deployments and/or applications. Further, disclosed implementations may not be limited to any specific combination of hardware, software and/or firmware. In addition, while a series of acts have been described with respect to FIGS. 5, 6A and 6B, the order of acts may be varied in other implementations. Moreover, non-dependent acts may be implemented in parallel.

Details of algorithms and/or techniques for analyzing speech samples has not been provided since implementations consistent with the principles of the invention may use substantially any such algorithms and/or techniques and/or may be customized based on particular requirements associated with an implementation of the invention.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device, comprising:
   a memory to store a plurality of speech inputs,
      each speech input, of the stored plurality of speech inputs, being received from a corresponding party of a plurality of parties; and
   a processor to:
      receive a first speech input from a particular party of the plurality of parties,
      access the speech input, of the stored plurality of speech inputs, received from the particular party based on receiving the first speech input,
         the accessed speech input including a particular phrase,
      provide a prompt to the particular party for the particular phrase,
      receive a second speech input from the particular party based on providing the prompt to the particular party,
      determine speech characteristics of the particular phrase included in the accessed speech input and speech characteristics of the received second speech input,
         the determined speech characteristics of the particular phrase including a number of pauses in the particular phrase, a frequency variability of a portion of the particular phrase, and at least one of: a non-fluency of a portion of the particular phrase, a speaking rate associated with the particular phrase, a length of a pause in the particular phrase, a misarticulation of a portion of the particular phrase, or a vocal intensity of a portion of the particular phrase, and
         the determined speech characteristics of the received second speech input including a number of pauses in the received second speech input, a frequency variability of a portion of the received second speech input, and at least one of: a non-fluency of a portion of the received second speech input, a speaking rate associated with the received second speech input, a length of a pause in the received second speech input, a misarticulation of a portion of the received second speech input, or a vocal intensity of a portion of the received second speech input,
      compare the determined speech characteristics of the particular phrase to the determined speech characteristics of the received second speech input to produce a result, and
      determine whether the party is impaired based on the result.

2. The device of claim 1, where, when comparing the determined speech characteristics of the particular phrase to the determined speech characteristics of the received second speech input, the processor is to:
   evaluate, using biometric voice verification techniques, the determined speech characteristics of the particular phrase and the determined speech characteristics of the received second speech input.

3. The device of claim 1, where, when determining the speech characteristics of the particular phrase and the speech characteristics of the received second speech input, the processor is to:
interpret speech segments comprising the accessed speech input and the received second speech input.

4. The device of claim 1, where the processor is further to:
receive the accessed speech input when the particular party is not impaired.

5. The device of claim 1, where the result represents a score indicative of a deviation between a segment of the received second speech input and a corresponding segment of the accessed speech input, and
where the segment of the accessed speech input includes the particular phrase.

6. The device of claim 1, where the processor is further to:
receive the accessed speech input via a first telephone call placed by the particular party, and
receive the second speech input via a second telephone call placed by the particular party.

7. The device of claim 1, where the processor is further to:
identify a schedule for receiving speech inputs from the particular party, and
determine whether the second speech input is received according to the schedule.

8. A method, comprising:
receiving, by a device, speech inputs from a plurality of parties;
storing, by the device, the received speech inputs;
receiving, by the device, a first speech input from a particular party of the plurality of parties;
accessing, by the device, a particular speech input, from the stored speech inputs, received from the particular party, based on the first speech input,
the particular speech input including a particular phrase;
providing, by the device, a prompt to the particular party for the particular phrase;
receiving, by the device, a second speech input from the particular party based on providing the prompt;
determining, by the device, speech characteristics of the particular phrase and speech characteristics of the second speech input,
the speech characteristics of the particular phrase including a number of pauses in the particular phrase and two or more of: a vocal intensity of a portion of the particular phrase, a speaking rate associated with the particular phrase, a length of a pause in the particular phrase, a misarticulation of a portion of the particular phrase, a non-fluency of a portion of the particular phrase, or a frequency variability of a portion of the particular phrase, and
the speech characteristics of the second speech input including a number of pauses in the second speech input and two or more of: a vocal intensity of a portion of the second speech input, a speaking rate associated with the second speech input, a length of a pause in the second speech input, a misarticulation of a portion of the second speech input, a non-fluency of a portion of the second speech input, or a frequency variability of a portion of the second speech input;
comparing, by the device, the determined speech characteristics of the second speech input to the determined speech characteristics of the particular phrase to produce a score; and
determining, by the device, a condition of the particular party based on the score.

9. The method of claim 8, where determining the condition comprises:
evaluating, using voice recognition logic or biometric voice verification logic, the determined speech characteristics of the second speech input and the determined speech characteristics of the particular phrase.

10. The method of claim 8, where comparing the determined speech characteristics of the second speech input to the determined speech characteristics of the particular phrase comprises:
identifying a deviation between at least one segment of the accessed particular speech input and a corresponding at least one segment of the second speech input,
the at least one segment of the accessed particular speech input including the particular phrase; and
producing the score based on the deviation.

11. The method of claim 8, where the accessed particular speech input includes a plurality of segments and the second speech input includes a corresponding plurality of segments, and
where comparing the determined speech characteristics of the second speech input to the determined speech characteristics of the particular phrase comprises:
comparing the corresponding plurality of segments to the plurality of segments to produce a plurality of results.

12. The method of claim 8, further comprising:
determining an identity of the particular party based on the first speech input prior to receiving the second speech input from the particular party.

13. The method of claim 12, where the particular party is located at a first location, and
where determining the identity is performed at a second location.

14. The method of claim 8, where determining the condition of the particular party comprises:
determining whether the particular party is impaired based on the score,
where the score represents a confidence level that the particular party is impaired.

15. The method of claim 8, where receiving the speech inputs comprises:
receiving the particular speech input from the particular party when the particular party is unimpaired.

16. A system comprising:
a memory to store:
instructions, and
store a plurality of speech inputs received from a plurality of users; and
a processor to execute instructions to:
receive a first speech input from a particular user of the plurality of users,
identify the particular user based on the first speech input,
access a particular speech input, from the stored plurality of speech inputs, based on identifying the particular user,
the particular speech input including a particular phrase, provide a prompt to the particular user for the particular phrase, receive a second speech input from the particular user based on providing the prompt,
determine characteristics of the particular phrase and characteristics of the second speech input,
the determined characteristics of the particular phrase including a number of pauses in the particular phrase, a frequency variability of a portion of the particular phrase, and at least one of: a non-fluency of a portion of the particular phrase, a speaking rate associated with the particular phrase, a length of a pause in the particular phrase, a misarticulation of a portion of the particular phrase, or a vocal intensity of a portion of the particular phrase, and the determined characteristics of the second speech input including a frequency variability of a portion of the second speech input, a number of pauses in the second speech input, and at least one of: a non-fluency of a portion of the second speech input, a speaking rate associated with the second speech input, a length of a pause in the second speech input, a misarticulation of a portion of the second speech input, or a vocal intensity of a portion of the second speech input, compare the determined characteristics of the particular speech input to the determined characteristics of the second speech input, and determine a condition of the particular user based on comparing the determined characteristics of the particular speech input to the determined characteristics of the second speech input.

17. The system of claim 16, where, when comparing the determined characteristics of the particular speech input to the determined characteristics of the second speech input, the processor is further to execute the instructions to:

process the particular speech input and the second speech input via speech recognition logic or biometric voice verification logic.

18. The system of claim 16, where the processor is further to execute the instructions to:

produce a score based on comparing the determined characteristics of the particular speech input to the determined characteristics of the second speech input, and determine whether the particular user is impaired based on the score.

19. The system of claim 18, where the processor is further to execute the instructions to use the score to determine whether the particular user is in compliance with a criteria.

20. The system of claim 16, where, when comparing the determined characteristics of the particular speech input to the determined characteristics of the second speech input, the processor is further to execute the instructions to compare:

one or more of: the vocal intensity of the portion of the particular phrase, the speaking rate associated with the particular phrase, the length of the pause in the particular phrase, the misarticulation of the portion of the particular phrase, or the non-fluency of the portion of the particular phrase, to corresponding one or more of: the vocal intensity of the portion of the second speech input, the speaking rate associated with the second speech input, the number of pauses in the second speech input, the length of the pause in the second speech input, the misarticulation of the portion of the second speech input, or the non-fluency of the portion of second speech input.

21. A non-transitory computer-readable medium for storing instructions, the instructions comprising:

one or more instructions which, when executed by a device, cause the device to receive speech inputs from a plurality of users;

one or more instructions which, when executed by the device, cause the device to store the speech inputs;

one or more instructions which, when executed by the device, cause the device to receive a first speech input from a particular user, of the plurality of users, during a telephone call from the particular user;

one or more instructions which, when executed by the device, cause the device to identify the particular user based on the first speech input;

one or more instructions which, when executed by the device, cause the device to access a particular speech input, from the stored speech inputs, based on identifying the particular user, the particular speech input including a particular phrase;

one or more instructions which, when executed by the device, cause the device to provide a prompt for the particular phrase;

one or more instructions which, when executed by the device, cause the device to receive a second speech input from the particular user based on providing the prompt;

one or more instructions which, when executed by the device, cause the device to compare the particular phrase to the second speech input, the one or more instructions to compare the particular phrase to the second speech input comprising one or more instructions to compare:

a number of pauses in the particular phrase and two or more of: a non-fluency of a portion of the particular phrase, a speaking rate associated with the particular phrase, a misarticulation of a portion of the particular phrase, a vocal intensity of a portion of the particular phrase, a frequency variability of a portion of the particular phrase, or a length of a pause in the particular phrase to a number of pauses in the second speech input and two or more of:

a non-fluency of a portion of the second speech input, a speaking rate associated with the second speech input, a misarticulation of a portion of the second speech input, a vocal intensity of a portion of the second speech input, a frequency variability of a portion of the second speech input, or a length of a pause in the second speech input; and one or more instructions which, when executed by the device, cause the device to determine whether the particular user is impaired based on comparing the particular phrase to the second speech input.

22. The non-transitory computer-readable medium of claim 21, the instructions further comprising:

one or more instructions to generate a score based on comparing the particular phrase to the second speech input; and one or more instructions to provide the score to another user associated with the device.

23. The non-transitory computer-readable medium of claim 21, the one or more instructions to compare the particular phrase to the second speech input further comprising:

one or more instructions to compare the number of pauses in the particular phrase to the number of pauses in the second speech input.

24. The non-transitory computer-readable medium of claim 21, the one or more instructions to compare the particular phrase to the second speech input further comprising:

one or more instructions to compare the speaking rate in the particular phrase to the speaking rate in the second speech input.

25. The non-transitory computer-readable medium of claim 21, the one or more instructions to compare the particular phrase to the second speech input further comprising:

one or more instructions to compare the frequency variability of the portion of the particular phrase to the frequency variability of the portion of the second speech input.

26. The non-transitory computer-readable medium of claim 21, the instructions further comprising:
one or more instructions to receive each speech input, of the speech inputs, from a corresponding user, of the plurality of users, when the user is not impaired.

* * * * *